United States Patent [19]

Arnold et al.

[11] 4,268,654

[45] May 19, 1981

[54] ACETYLENE TERMINATED MATRIX AND ADHESIVE OLIGOMERIC COMPOSITIONS

[75] Inventors: Fred E. Arnold, Centerville; Bruce A. Reinhardt, New Carlisle, both of Ohio

[73] Assignee: The United States of America as represented by the Secretary of the Air Force, Washington, D.C.

[21] Appl. No.: 88,504

[22] Filed: Oct. 26, 1979

[51] Int. Cl.³ ............................................. C08G 73/06
[52] U.S. Cl. .................................. 526/259; 526/285; 544/353; 544/354
[58] Field of Search ................ 526/259, 285; 544/353, 544/354

[56] References Cited

U.S. PATENT DOCUMENTS 3,905,941 9/1975 Jones .................................... 526/259
4,147,868 4/1979 Arnold et al. ....................... 544/353

*Primary Examiner*—Lester L. Lee
*Attorney, Agent, or Firm*—Donald J. Singer; William J. O'Brien

[57] ABSTRACT

A composition prepared by mixing a high Tg, acetylene-terminated phenylquinoxaline oligomer with an acetylene-substituted reactive diluent. The presence of the reactive diluent in the mixture effectively lowers the Tg of the oligomer so as to provide the composition with adequate flow for melt processing.

8 Claims, 1 Drawing Figure

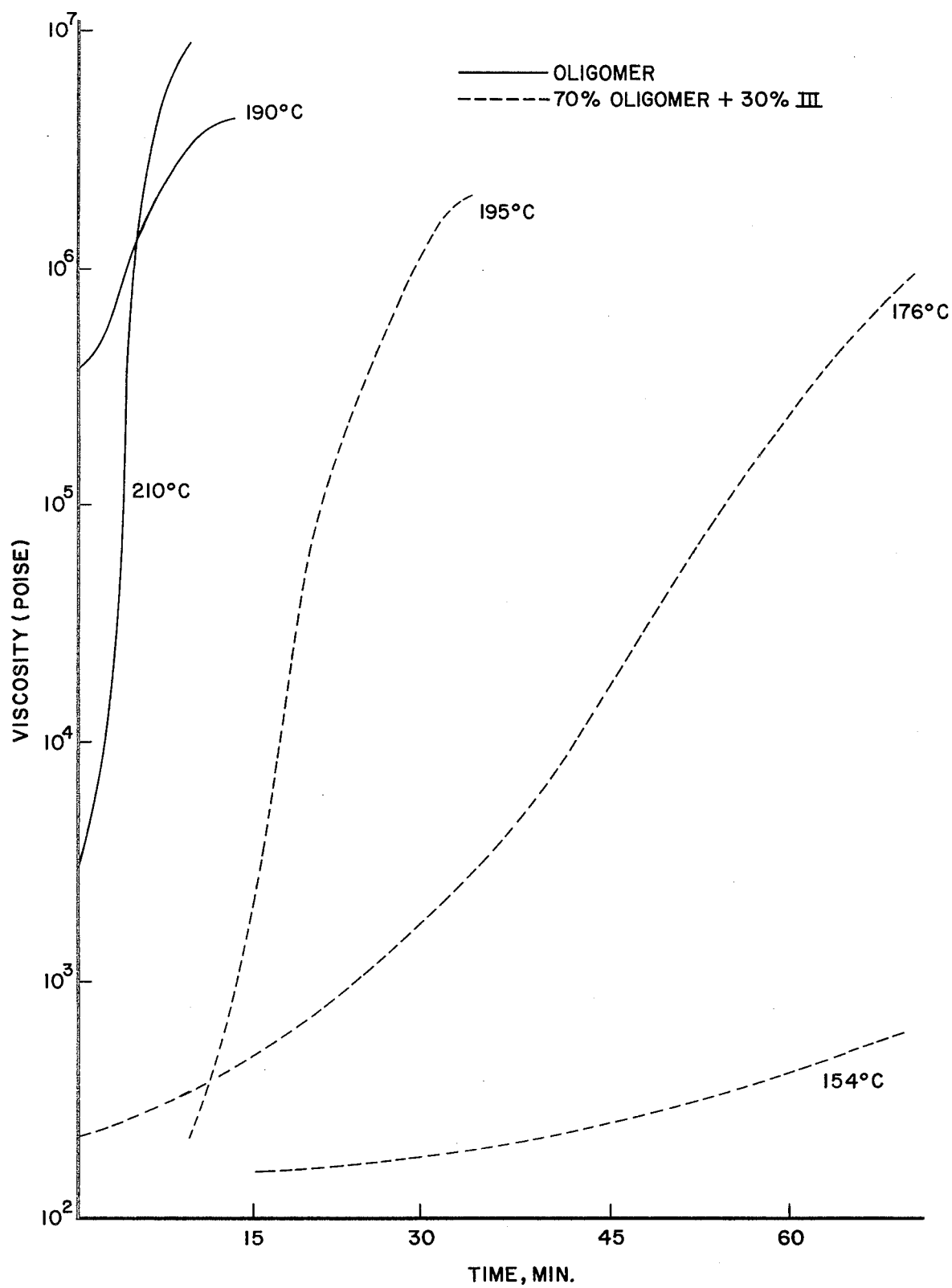

ACETYLENE TERMINATED MATRIX AND ADHESIVE OLIGOMERIC COMPOSITIONS

RIGHTS OF THE GOVERNMENT

The invention described herein may be manufactured and used by or for the Government of the United States for all governmental purposes without the payment of any royalty.

FIELD OF THE INVENTION

This invention relates to acetylene-terminated phenylquinoxaline resin compositions which have adequate flow characteristics necessary for melt processing.

BACKGROUND OF THE INVENTION

To meet a variety of advanced aircraft and aerospace requirements, there is a need for high temperature thermoset resins for matrix and adhesive applications. Such resins, because of the complexity of structure, the high glass transition temperature needed and high temperature thermooxidative stability required, have critical processing difficulties when required to conform to the state-of-the-art processing criteria. OSHA requirements negate processing such materials from solvent base systems, thereby necessitating fabrication of the resins via melt techniques.

As disclosed in U.S. Pat. Nos. 3,966,729 and 4,147,868, recent advances in matrix and adhesive resins have resulted in the discovery of new phenylquinoxaline resins terminated by primary acetylene groups. The acetylene moiety can be thermally homopolymerized between 200° and 250° C. to form a moisture insensitive, high temperature resin system. Although the materials show excellent resistance to heat and environmental surroundings, they lack the necessary flow required for melt processing because of their high glass transition temperature (Tg) (140°–170° C.).

It is a principal object of this invention, therefore, to reduce the Tg of selected acetylene-terminated phenylquinoxaline oligomers so that they have flow characteristics required for melt processing.

Another object of the invention is to provide a composition containing an acetylene-terminated phenylquinoxaline oligomer and, as a reactive diluent, an acetylene-substituted aromatic ether.

A further object of the invention is to provide oligomer-reactive diluent materials which co-cure on thermal treatment.

Other objects and advantages of the invention will become apparent to those skilled in the art upon consideration of the ensuing disclosure and the drawing which shows graphically the cure rheometry, i.e., variations in viscosity with time at certain constant temperatures, of compositions of this invention and of oligomers per se.

SUMMARY OF THE INVENTION

The present invention resides in a composition consisting essentially of a mixture of (1) an acetylene-terminated phenylquinoxaline oligomer and (2) an acetylene-substituted reactive diluent. The presence of the reactive diluent in the mixture effectively lowers the Tg of the oligomers so as to provide the composition with adequate flow for melt processing. As a result the compositions are eminently suitable for use in the fabrication of structural reinforced composites while meeting rigid OSHA regulations.

The oligomers used in the composition are high Tg, acetylene-terminated phenylquinoxaline resins that can be represented by the following formula:

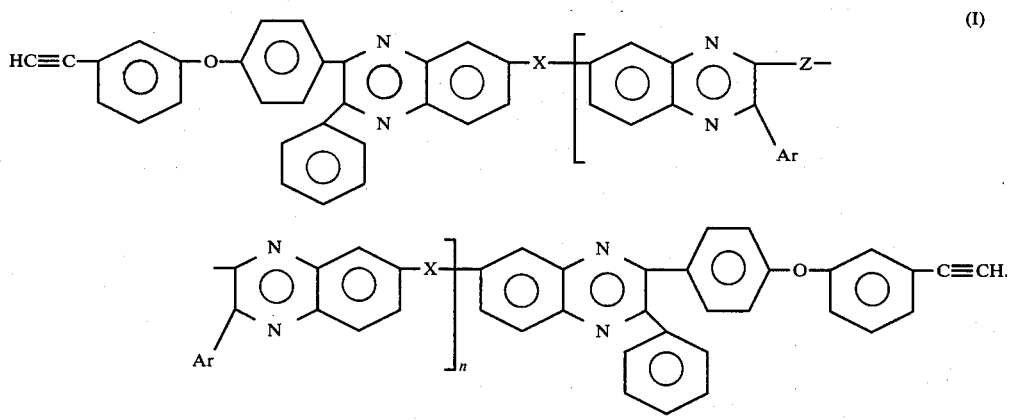

In the above formula, X is a single bond,

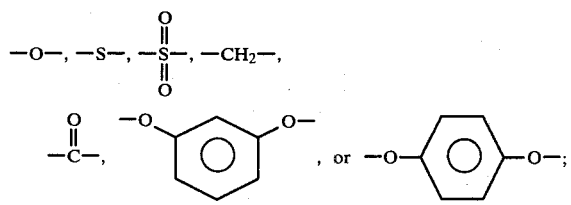

Z is

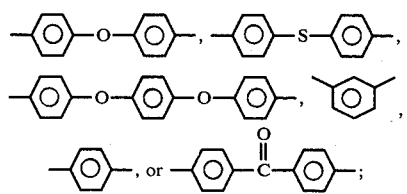

and Ar is

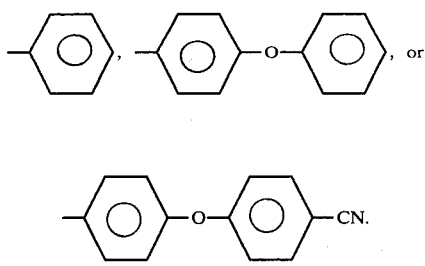

The letter n is an integer indicating the number of recurring units and is usually in the range of 1 to 20, inclusive. The oligomers and a process for their preparation are disclosed in U.S. Pat. No. 4,147,868, the disclosure of which is incorporated herein by reference.

The acetylene-substituted aromatic compounds used as reactive diluents can be represented by the following structural formulas:

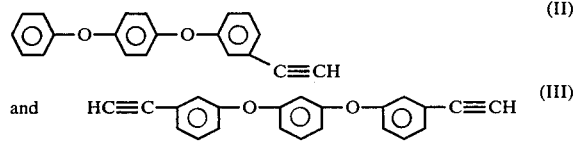

The reactive diluents are new compounds which are prepared as described hereinafter in Examples I and II. Additional details regarding the acetylene-substituted aromatic ethers are disclosed in our copending patent application Ser. No. 088,505, filed on Oct. 26, 1979, the disclosure of which is incorporated herein by reference.

The reactive diluents are completely compatible with the high Tg oligomers and have very low glass transition temperatures (II = −49° C.; III = −39° C.). Since the materials are soluble in the same solvents, the preferred procedure for mixing the materials is to dissolve the materials in a solvent and then remove the solvent under reduced pressure. There is thus obtained a homogeneous mixture of the oligomer and reactive diluent. Examples of solvents that can be employed include methylene chloride, tetrahydrofuran and dioxane.

The amount of reactive diluent contained in the composition usually ranges from about 1 to 40 weight percent, preferably about 5 to 30 weight percent, based upon the total weight of the composition. The oligomers and the reactive diluents co-cure on thermal treatment. Thus, the composition can be readily cured by heating in an inert or oxidative atmosphere at a temperature ranging from about 250° to 300° C. for about 2 to 8 hours.

A more complete understanding of the invention can be obtained by referring to the following illustrative examples which are not intended, however, to be unduly limitative of the invention.

EXAMPLE I

1-Phenoxy-3-(m-ethynylphenoxy)benzene (II)

A solution of 24.6 g (0.726 mol) of 1-phenoxy-3-(m-bromophenoxy)benzene, 6.31 g (75.0 mmol) of 2-methyl-3-butyn-2-ol and 0.36 g triphenylphosphine in 200 ml triethylamine was degassed with nitrogen for 20 minutes. To the degassed solution was added 0.036 g (0.0508 mmol) of bis-triphenylphosphine palladium II dichloride and 0.14 g (0.755 mmol) cuprous iodide. The mixture was heated to reflux for 24 hours, cooled to room temperature and the triethylamine removed under reduced pressure. The resulting yellow-green oil was dissolved in methylene chloride, dried over MgSO4, filtered and chromatographed on silica gel using 1:1 methylene chloride-hexane as the eluent. After solvent was removed under reduced pressure, 24.0 g (96%) of an orange oil was recovered.

Analysis Calc'd for $C_{23}H_{19}O_3$: C,80.21; H,5.56; Found: C,79.85; H,5.39.

A solution of 24.0 g (0.0697 mol) of the butynol adduct, a mixture of 0.75 g of potassium hydroxide dissolved in 20 ml of methanol, and 100 ml of toluene was heated to reflux under nitrogen. During the course of two hours the methanol and 60 ml of toluene were removed by distillation. The remaining toluene was removed under reduced pressure. The resulting dark oil was chromatographed on silica gel using 3:1 hexane-methylene chloride as the eluent. The solvent was removed under reduced pressure to give 17.10 g (81.7%) of a light yellow, viscous oil.

Analysis Calc'd for $C_{20}H_{13}O_2$: C,83.90; H,4.58; Found: C,83.30; H,4.62.

EXAMPLE II 1,3-Bis-(m-ethynylphenoxy)benzene (III)

A mixture of 12.60 g (0.03 mole) of 1,3-bis-(m-bromophenoxy)benzene and 6.03 g (0.072 mole) of 2-methyl-3-butyn-2-ol and 100 ml of triethylamine was degassed by passing nitrogen through the solution for 20 minutes. To the reaction mixture was then added 0.03 g (0.042 mmol) of bis-triphenylphosphine palladium II dichloride, 0.13 g (0.624 mmol) of cuprous iodide and 0.30 g (1.14 mmol) of triphenylphosphine. The temperature of the reaction mixture was raised to 80° C. and maintained there for 24 hours. The reaction was then cooled to room temperature and the triethylamine removed under reduced pressure. The resulting yellow-red oil was chromatographed on a 5 cm × 60 cm dry silica gel column (quartz) using 1:1 hexane-ether as the eluent. The second fluorescent band was collected (appears yellow on the column). The solvent was removed under reduced pressure to yield 10.6 g (83%) of a dark viscous oil. The product was used in the next step of the reaction sequence without further purification.

A mixture of 10.6 g of the bis-butynol adduct and 0.75 g of KOH in 20 ml of anhydrous methanol were added to 100 ml of toluene and heated to reflux under nitrogen. The methanol and 40 ml of the toluene were then removed by distillation over a period of two hours. The reaction was monitored by TLC on silica gel plates containing fluorescent indicator using 3:1 hexane-methylene chloride as the developing solvent. The product appeared as the first spot to be eluted. The reaction was judged to be complete when no starting material appeared at the origin of the TLC plate after developement. After a total reaction time of two hours, the reaction mixture was cooled, and the toluene removed at 35° C. under reduced pressure. The red viscous residue was chromatographed on a dry 5 cm × 60 cm column (quartz) of silica gel using 3:1 hexane-methylene chloride. The first large fluorescent band was collected and the solvent removed at 50° C. under high vacuum. The last traces of hexane were removed by pumping on the yellow oil for 18 hours at 0.2 mm pressure. The yield of pure product was 6.1 g (79%).

Analysis Calc'd for $C_{22}H_{14}O_2$: C,85.07; H,4.54; Found: C,84.72; H,4.23.

EXAMPLE III

Samples of the reactive diluents prepared in Examples I and II were mixed in various percentages with an acetylene-terminated phenylquinoxaline oligomer described above wherein X=single bond,

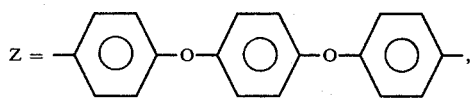

and Ar=

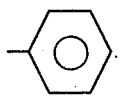

The oligomer had a Tg of 165° C. Various amounts of the oligomer and reactive diluents were dissolved in methylene chloride after which the solvent was removed under reduced pressure.

Small samples of the various mixtures were placed in test tubes. The tubes were heated at 280° C. for 6 hours, removed and allowed to cool to room temperature. Thermal mechanical analysis (TMA) or differential scanning calorimetry (DSC) was determined on the non-cured and co-cured mixtures to determine the reduction in Tg or the effective lowering of Tg for fabrication. The data obtained are shown below in the table.

TABLE

| % Diluent | % Oligomer | Tg° C.[1] Uncured | Tg° C.[2] Co-cured[4] | Reduction[3] Tg° C. |
|---|---|---|---|---|
| 100(II) | 0 | −49° C. | | |
| 100(III) | 0 | −39° C. | | |
| 0 | 100 | 165° C. | | |
| 20(II) | 80 | 91° C. | 223° C. | 74° C. |
| 30(II) | 70 | 70° C. | 184° C. | 95° C. |
| 10(III) | 90 | 106° C. | 311° C. | 59° C. |
| 20(III) | 80 | 72° C. | 306° C. | 93° C. |
| 30(III) | 70 | 58° C. | 314° C. | 107° C. |

[1]Determined by DSC at a heating rate of 20° C./min.
[2]Determined by TMA at a heating rate of 20° C./min.
[3]Reduction in Tg of oligomer resulting from reactive diluent.
[4]Mixture co-cured at 280° C. for 6 hours.

EXAMPLE IV

Samples of the oligomer described in Example III and reactive diluent III, as prepared in Example II, were dissolved in tetrahydrofuran and precipitated into water to provide a finely divided powder which was dried under vacuum (30 mm Hg) at 60° C. Specimens were prepared by pressing the uncured powder mixture at 40,000 psi into 12 mm diameter by 2 mm thick pellets. Pellets were also prepared in a similar manner for the oligomer alone.

In a series of runs, the pellets were placed between preheated parallel plates in Rheometrics RMS-7200 Mechanical Spectrometer. The pellets were subjected to low frequency (160 mHz) sinusoidal shear rate viscocity measurements at constant temperatures. The results of the runs are shown graphically in the drawing together with the temperatures used.

As seen from the graphs shown in the drawing, the processing window for the composition of this invention is greatly expanded over that of the oligomer alone. For example, the amount of time allowed for processing the present composition over the oligomer alone is increased 12 minutes at 195° C. and 41 minutes at 176° C. for the ideal fabricating viscosity of $10^4$ poise. Furthermore, the presence of the reactive diluent permits processing at the lower temperature of 154° C. with times greater than one hour whereas the oligomer alone exhibits no flow below 180° C.

From the foregoing, it is seen that by mixing the acetylene-substituted reactive diluent with the high Tg, acetylene-terminated phenylquinoxaline oligomer, a composition is obtained that has a decreased glass transition temperature. As a result of lowering of the Tg, the composition flows for a longer period of time at a lower temperature. The composition can be advantageously utilized, therefore, in the fabrication of composite structures via melt techniques.

As will be evident to those skilled in the art, modifications of the present invention can be made in view of the foregoing disclosure without departing from the spirit and scope of the invention.

We claim:
1. A composition consisting essentially of (1) an acetylene-terminated quinoxaline oligomer having the following structure formula:

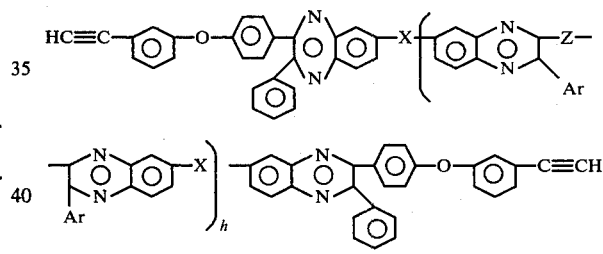

wherein X is a single bond, —O—, —S—,

—CH₂—,

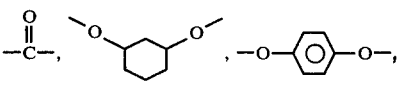

Z is

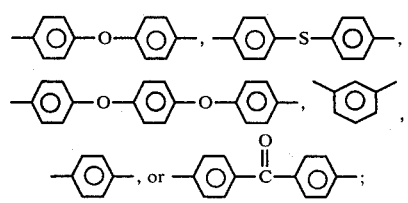

Ar is

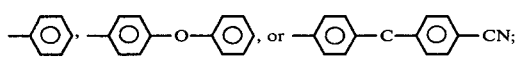

and n is an integer ranging from 1 to 20, inclusive; and (2) about 1 to 40 weight percent, based on the total weight of the composition, of an acetylene-substituted compound selected from the group of compounds having the following structural formulas:

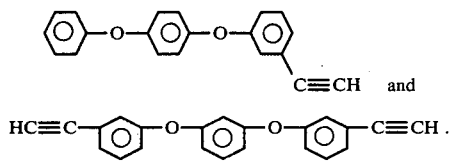

2. The composition according to claim 1 that consists essentially of the oligomer and about 5 to 30 weight percent of the acetylene-substituted compound, based upon the total weight of the composition.

3. The composition according to claim 1 or 2 in which X is a single bond, Z is

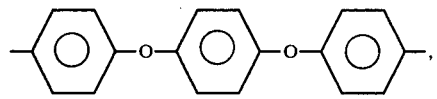

and Ar is

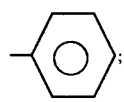

and the acetylene-substituted compound is compound (a).

4. The composition according to claim 1 or 2 in which X is a single bond, Z is

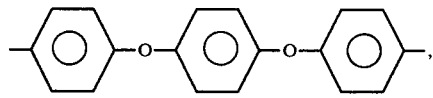

and Ar is

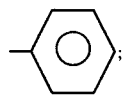

and the acetylene-substituted compound is compound (b).

5. The composition according to claim 1 and 2 in which X is a single bond, Z is

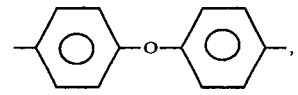

and Ar is

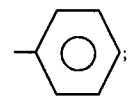

and the acetylene-substituted compound is compound (a).

6. The composition according to claim 1 or 2 in which X is a single bond, Z is

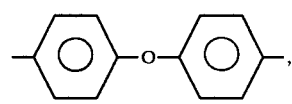

and Ar is

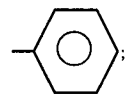

and the acetylene-substituted compound is compound (b).

7. The composition according to claim 1 or 2 in which X is —O—, Z is

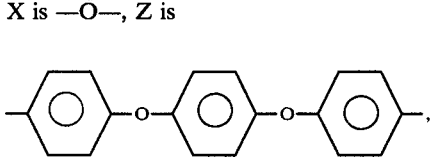

and Ar is

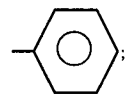

and the acetylene-substituted compound is compound (a).

8. The composition according to claim 1 or 2 in which X is —O—, Z is

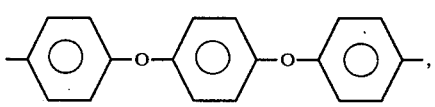

and Ar is

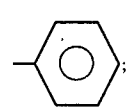

and the acetylene-substituted compound is compound (b).

* * * * *